INVENTOR:
WADE V. BOWMAN
and CLAUD T. MILLER
BY Eaton & Bell
ATTORNEYS

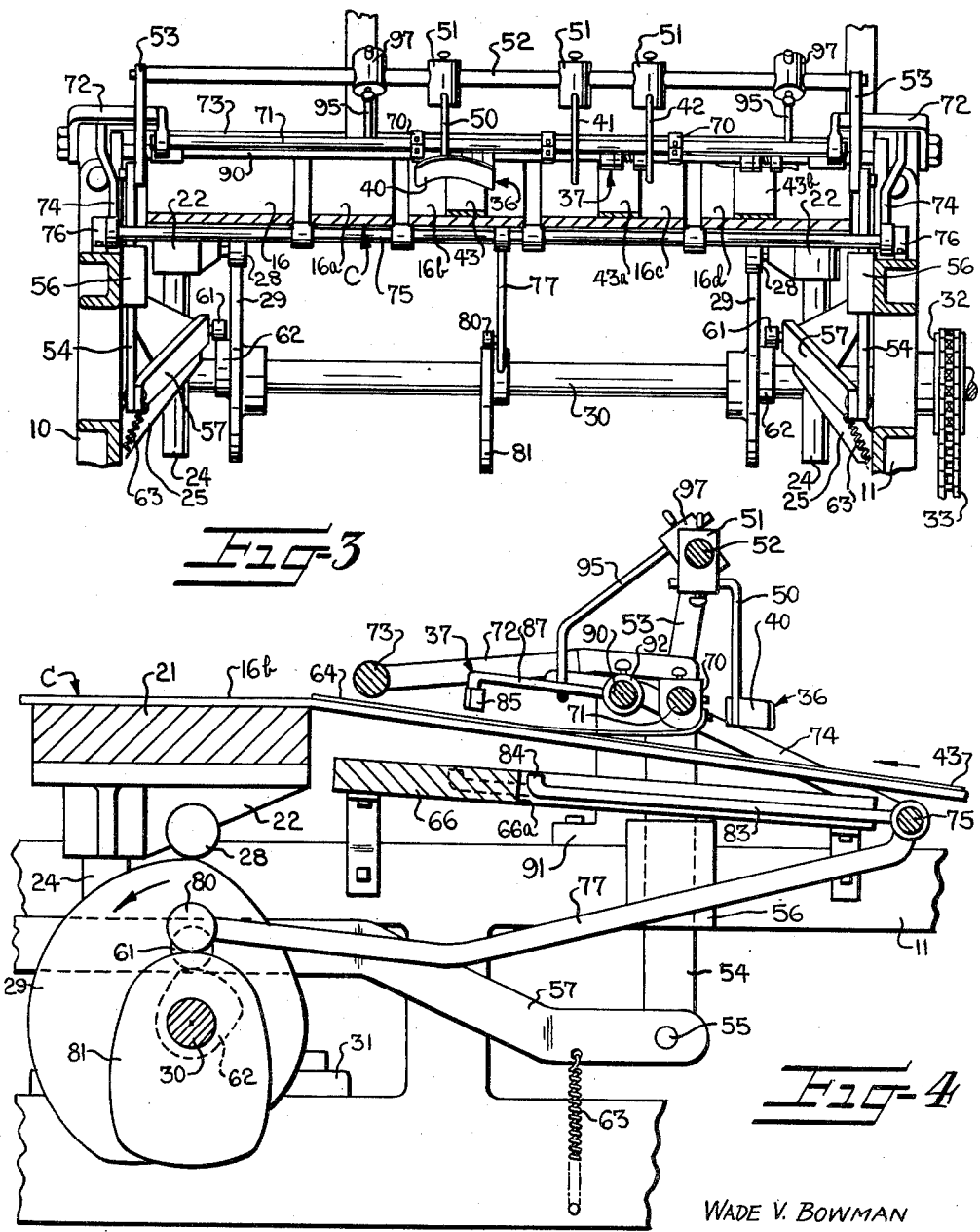

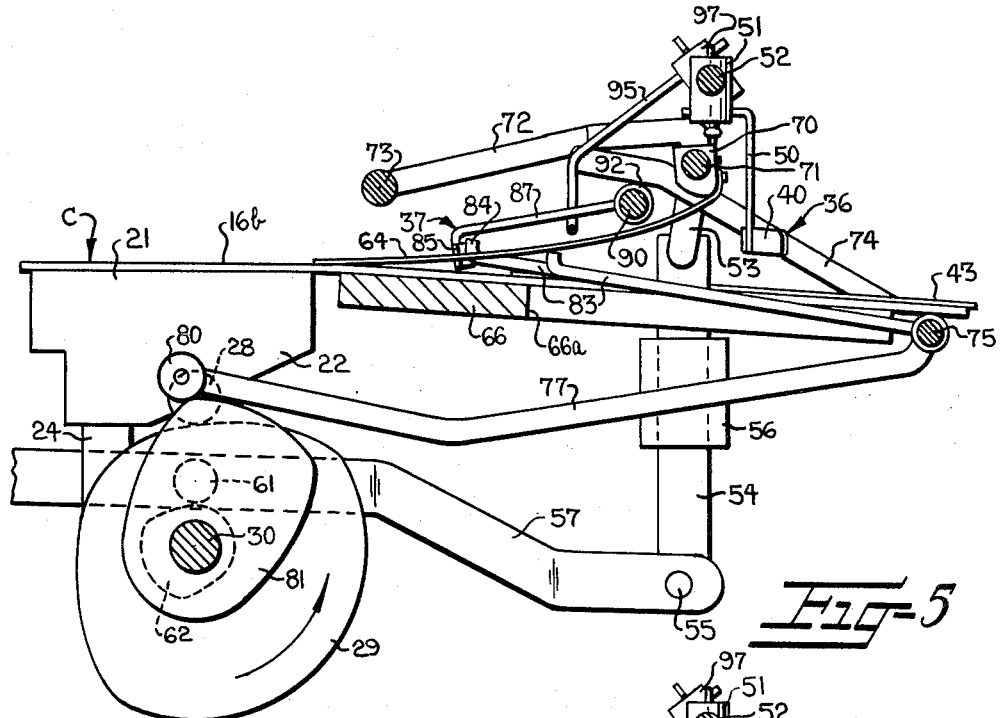
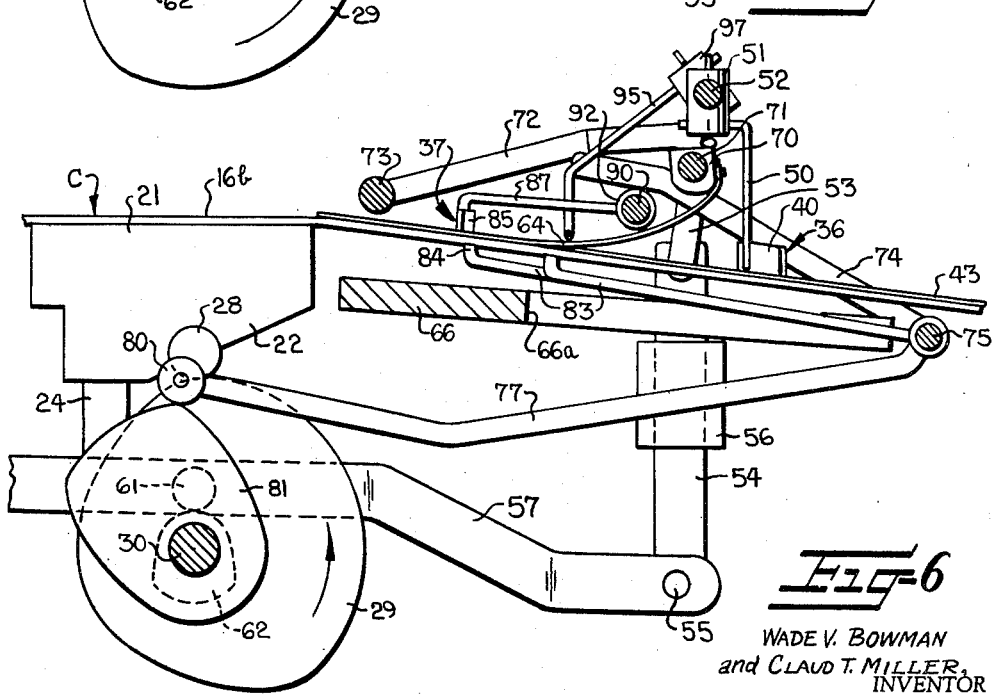

United States Patent Office 2,759,283
Patented Aug. 21, 1956

2,759,283

ARTICLE POSITIONING APPARATUS FOR A TRANSFER APPLYING MACHINE

Wade V. Bowman and Claud T. Miller, Hickory, N. C.

Application March 29, 1954, Serial No. 419,178

13 Claims. (Cl. 41—1)

This invention relates to apparatus for automatically positioning articles on a movable platform or conveyor and, more specially, to an improved apparatus for accurately positioning irregularly-shaped articles, such as hosiery and the like on a conveyor for the purpose of subsequently applying decalcomania thereto. The present apparatus is particularly devised for use with a machine of the character disclosed in the copending application of the applicant Bowman entitled Transfer Applying Apparatus and Counting Mechanism Therefor, Serial Number 346,752, filed April 3, 1953, now abandoned, and of which the present application is a continuation-in-part.

Various types of machines have been devised heretofore for the purpose of applying transfers to the toe, foot and heel of hosiery or for otherwise printing a desired indicia thereon, such machines usually being provided with conveyor belts on which it was necessary to accurately position each successive hose by hand in order to insure that the indicia subsequently applied to each successive hose be uniformly positioned.

Various attempts have been made to attempt to provide suitable positioning guides, such as disclosed in said copending application, against which the toe and heel of each successive hose is carefully positioned by the operator, after which the guides are raised to permit each successive hose to pass therebeneath on the conveyor belts.

However, the task of carefully positioning each successive hose against such guides has been painstaking and time consuming and has consequently limited the speed at which the transfer applying machine could be operated. It is therefore the object of this invention to provide a simple and effective means to assist in accurately positioning each successive article or hose upon moving conveyor belts preparatory to advancing the hose through a transfer applying means or printing means or through any subsequent operation in which it is necessary that the hose or other articles be accurately positioned.

It is another object of this invention to provide apparatus of the character described wherein a plurality of closely spaced or side by side conveyor belts are provided and upon which a plurality of elongated thin flat members are so positioned as to partially support each successive hose thereon to permit the conveyor belts to engage each hose adjacent the flat members and to slide the hose on the flat members for accurately positioning the same.

It is is another object of this invention to provide a primary device movable into and out of the path of travel of the hose and a secondary positioning device wherein the secondary positioning device is positioned immediately above the thin elongated members and has a curved guide thereon against which the heel of each successive hose is positioned.

Spaced from the curved guide are one or more stop members against which the leading edge of each successive hose is moved upon the heel thereof being positioned against the guide by means of the conveyor belts, the elongated thin members permitting the hose to move relative to the belts although they are held by the belts. The positioning devices are operated automatically to move out of the path of each successive hose after the hose has been properly positioned.

Some of the objects of the invention having been stated, other objects will appear as the description proceeds, when taken in connection with the accompanying drawings in which—

Figure 3 is a transverse vertical sectional view taken substantially along lines 3—3 in Figure 2;

Figure 4 is an enlarged fragmentary longitudinal vertical sectional view taken substantially along lines 4—4 in Figure 1;

Figures 5 and 6 are views similar to Figure 4 but showing the various movable parts in different positions.

Referring more specifically to the drawings, only so much of a machine of the type disclosed in said copending application Serial Number 346,752 is illustrated as deemed necessary to provide a clear understanding of the present invention. This machine comprises a frame including side frame members 10 and 11 and a transverse plate member or table 12 of rigid material, one end of which is fixed to the frame member 11. The machine includes endless conveyor C, only a portion of the feed end of which is illustrated in the present drawings, this conveyor being intermittently driven in a step-by-step manner for propelling articles such as hose indicated at A in Figure 1, through or past a device which operates upon the hose and wherein it is necessary that the hose be accurately positioned prior to being advanced through the device.

Figure 1:
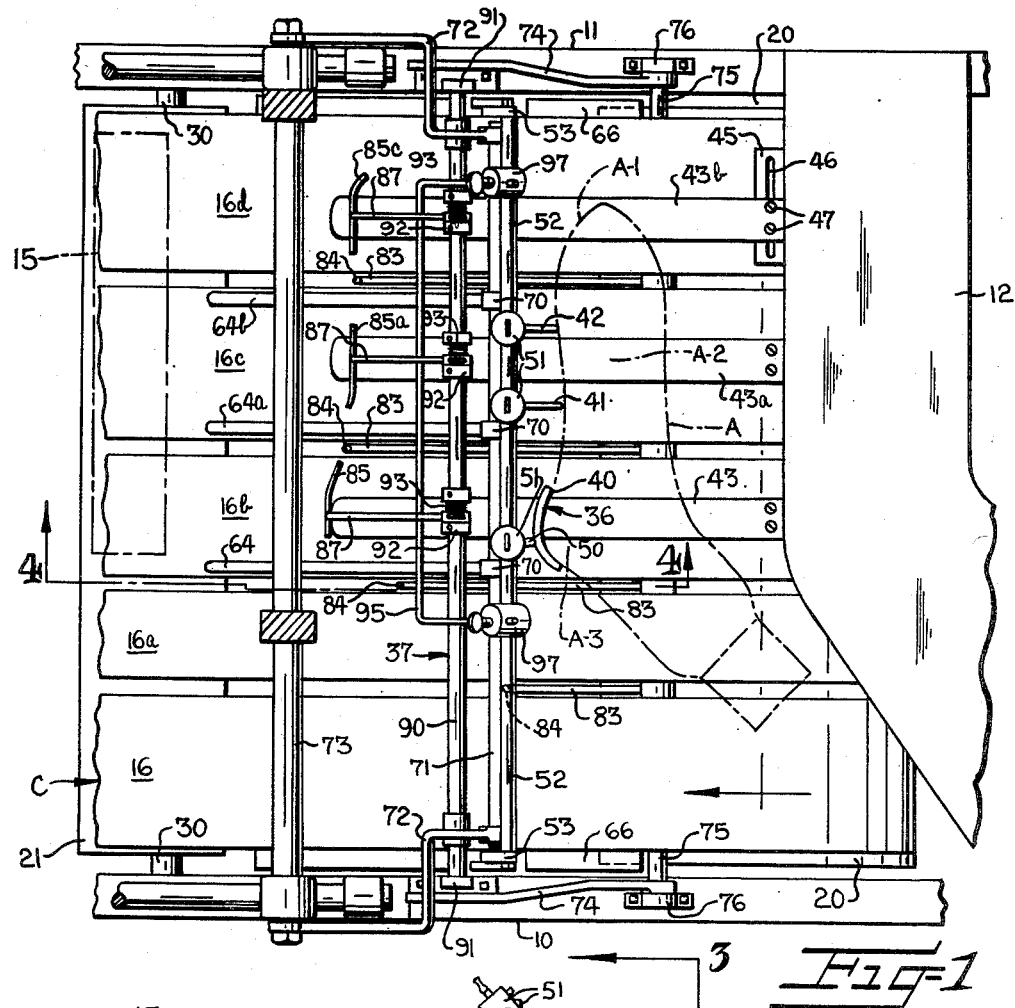
Figure 1 is a fragmentary top plan view, partially in section, showing the feed end of a machine of the character disclosed in said copending application and showing the improved hose positioning apparatus mounted thereon.
Figure 2:
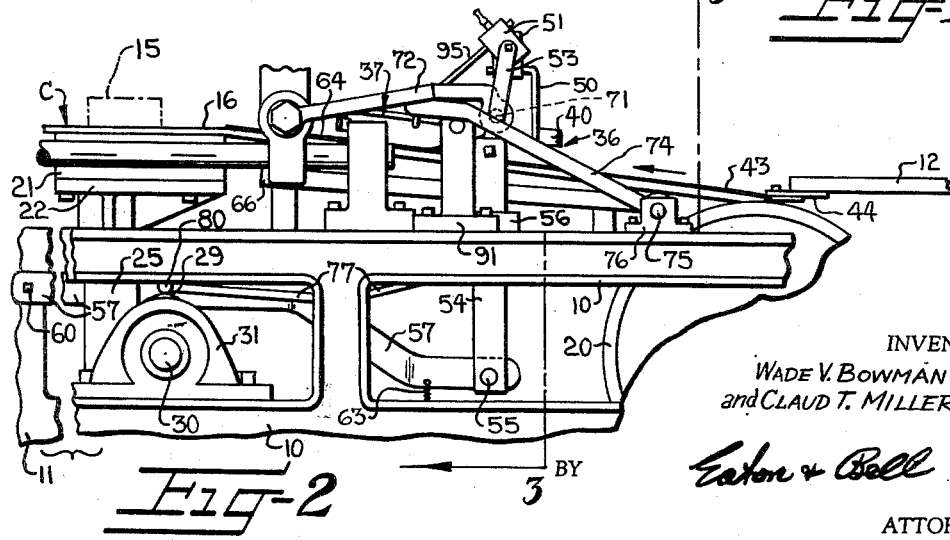
Figure 2 is a fragmentary elevation looking at the lower side of Figure 1.

The operating device is shown schematically and indicated at 15 in Figures 1 and 2. In said copending application, the device 15, as exemplified in the present drawings, embodies means for applying transfer marks to the toe, foot and heel portion of each successive hose A, the toe, foot and heel portions of the hose A in Figure 1 being respectively designated at A-1, A-2 and A-3. The transfer applying device or mechanism 15 may also be of substantially the type disclosed in U. S. Patent Number 2,286,458, issued June 16, 1942, and a detailed illustration and description thereof is thus deemed unnecessary.

Also, the means for driving the conveyor in a step-by-step manner may be substantially as disclosed in said copending application and illustration and description thereof is also deemed unnecessary.

The conveyor comprises a plurality of closely spaced relatively narrow flat endless belts, there being five conveyor belts shown in this instance which are indicated at 16 and 16a to 16d, inclusive. Corresponding end portions or feed end portions of the conveyor belts 16 and 16a to 16d, inclusive, are mounted on a roll or drum 20 which is driven in a step-by-step manner, and, as the upper reaches of the endless belts move forwardly from the drum or roll 20, they pass over a transversely disposed conveyor belt lifting element or bar 21 which is disposed in the same vertical plane as the transfer applying mechanism 15. Opposite ends of the conveyor belt lifting bar 21 are supported on brackets or supports 22, each of which is fixed on the upper end of a substantially vertically disposed guide rod 24 whose medial portion is mounted for vertical sliding movement in a corresponding guide block or bracket 25. The guide block brackets 25 are suitably secured to the corresponding side frame members 10 and 11 (Figure 3).

The belt lifting mechanism, of which the lifting bar 21, brackets 22, guide rods 24 and guide brackets 25 are parts, may be substantially the same construction as that disclosed in said copending application and this belt lifting mechanism functions to move the endless conveyor belts 16 and 16a to 16d, inclusive, upwardly in the interim between each advance of the conveyor belts.

To this end, each of the lifting bar supports 22 has a cam follower 28 thereon which rides upon the periphery of a corresponding camwheel 29. The camwheels 29 are fixed on a cam shaft 30 suitably journaled on the frame members 10 and 11, as by bearing blocks 31, only one of which is shown in Figure 2. One end of cam shaft 30 has a sprocket wheel 32 fixed thereon which is engaged by a constantly driven endless chain 33 which endless chain is driven by any suitable means such as clearly illustrated in said copending application to impart rotation to the cam shaft 30 in timed relation to the speed of the conveyor C to thus raise the table 21 at predetermined intervals.

The improved article or hose positioning or locating apparatus generally comprises a rear or primary positioning unit which is spaced rearwardly of a secondary or front article positioning unit. The primary and secondary article positioning units are disposed above the conveyor C and a plurality of relatively narrow article slides rest upon certain of the conveyor belts and extend beneath the primary and secondary positioning units adjacent the feed end of the conveyor. Thus, each successive hose may be placed against stops on the primary positioning unit and upon the article slides between each advance of the conveyor C and means are provided for then raising the stops of the primary positioning unit while moving stops the the secondary positioning unit into operative position substantially as the next step in movement is imparted to the conveyor.

Thus, the hose need not be exactly positioned in engagement with the stops of the primary positioning unit since the forward movement of the conveyor tends to slide the hose along the article slides and the leading edge portions of the hose are thereby moved into engagement with the stops of the secondary positioning unit.

The distance between the stop elements of the primary and secondary positioning units is less than the distance from the secondary positioning unit to the transfer applying or printing device 15 and each step in movement by the conveyor C is such that the hose positioned in engagement with stops of the secondary positioning unit is advanced from the secondary positioning unit to the vertical plane of the device 15. The conveyor continues to move after the leading edge of each successive hose has moved into engagement with the stop elements of the secondary positioning unit so that frictional contact of the portions of the hose between the article slides with the conveyor belts causes corresponding portions of each successive hose to engage all of the stop elements or guide elements of the secondary positioning unit. Thus, when each successive article is released from the secondary positioning unit, it is accurately positioned relative to the conveyor and is thereby accurately positioned so that the indicia subsequently applied thereto are uniformly applied to each successive hose.

Specifically, the primary or rear positioning unit is broadly designated at 36 and the secondary hose or article positioning unit is broadly designated at 37. The primary article or hose positioning unit comprises a plurality of laterally spaced stop elements, or guide elements indicated at 40, 41 and 42 whose lower edges are normally positioned immediately above the conveyor C.

In this instance the guide or stop element 40 is in the form of an upright relatively narrow plate which is curved to conform substantially to the shape of the heel A-3 of each successive hose A and, during the interim between each advance of the conveyor C, the lower edge of the guide element 40 is spaced immediately above the conveyor belt 16b and above the medial portion of one of a plurality of elongated relatively thin and relatively narrow article slides which are preferably made from a leaf spring metal, there being three such article slides shown in Figure 1, respectively designated at 43, 43a and 43b. The article slides 43, 43a and 43b resiliently bear against the upper surfaces of the respective endless belts or conveyor belts 16b, 16c and 16d. The lower ends of the stop elements 41 and 42 straddle the medial portion of the intermediate or center article slide 43a and are so positioned as to be engaged by spaced portions of the leading edge of the foot portion A-2 of each successive article A while the toe portion A-1 of each successive article is initially positioned upon the medial portion of the slide 43b as clearly shown in Figure 1.

The heel supporting article slide 43 and the foot supporting article slide 43a are each suitably secured at their rear ends to blocks or brackets 44 fixed to the lower surface of the platform 12 and the right-hand or toe supporting article slide 43b is adjustably secured to an elongated transversely extending bracket 45 which is also suitably secured to and projects forwardly from the lower surface of the plate or platform 12. In order to facilitate lateral adjustment of the toe supporting slide 43b to accommodate hose of various sizes, the bracket 45 has a slot 46 therein which is penetrated by bolts 47 for adjustably securing the toe supporting slide 43b to the bracket 45.

Although the article slides 43, 43a and 43b need not necessarily be made from a leaf spring material, they should be made from a relatively thin smooth material and should be of substantially less width than the corresponding belts of the conveyor C and they should also be disposed against or in close proximity to the upper surfaces of the upper reaches of the belts of the conveyor C in order to insure that the portions of each successive hose A between adjacent article slides or which are not supported by the article slides may rest against and be frictionally engaged by the corresponding belts of the conveyor C.

The heel contour guide 40 of the primary positioning unit 36 is fixed on the lower end of a rod or bar 50. Each of the stop or guide elements 41 and 42 are shown in the form of rods or pins and the upper ends of each of the rods 41, 42 and 50 is bent forwardly and fixed in the lower portion of a block 51. The blocks 51 are mounted on a common transverse rocker shaft 52 whose opposite ends are adjustably secured to the upper ends of links 53.

The lower ends of the links 53 are adjustably secured to the upper ends of guide post 54 mounted for vertical sliding movement in guide blocks 56 carried by the side frame members 10 and 11.

The lower end of each guide post 54 is pivotally connected, as at 55 (Figures 2, 4, 5 and 6), to the rear ends of a lever 57. Each of the levers 57 extends forwardly above the cam shaft 30 and inwardly to clear the brackets 25 and is pivotally connected, as at 60 (Figure 2) to the corresponding side frame member 10 or 11, as the case may be. Each of the levers 57 has a cam follower 61 on its medial portion which is urged against the upper surface of a corresponding irregularly-shaped cam wheel 62 by means of a spring 63. The cams 62 are fixed on the cam shaft 30 and are illustrated as being integral with the cam wheels 29.

It is thus seen that, when the followers 61 are in engagement with the high points of the respective cam wheels 62, the stop or guide elements 40, 41 and 42 of the primary positioning unit are raised sufficiently above the conveyor C and the leaf spring article slides 43, 43a and 43b to permit the hose or article A to pass therebetween. As each successive article or hose A is moved forwardly by the conveyor C upon the stop elements or guide elements 40, 41 and 42 of the primary positioning unit 36 being elevated in the manner described, each successive article or hose A passes beneath and is engaged by a plurality of longitudinally extending laterally spaced resilient hold down or pressure applying elements, there being three such pressure applying elements or members shown in Figure 1 and indicated at 64, 64a and 64b.

The pressure applying elements 64, 64a and 64b are each shown in the form of an elongated relatively thin and relatively narrow leaf spring member and the element 64 normally bears against the upper surface of the conveyor belt 16b and the pressure applying elements 64a and 64b bear against the upper surface of the conveyor belt 16c. It should be noted that the pressure applying elements 64 and 64a straddle the front portion of and extend forwardly beyond the leaf spring article slide 43 and the pressure applying elements 64a and 64b straddle and extend forwardly beyond the front end portion of the article slide 43a. Since the slides 43, 43a and 43b and the pressure applying elements 64, 64a and 64b apply pressure to the belts 16b, 16c and 16d, it is preferable that a plate or belt supporting platform 66 be provided beneath the portion of the upper reach of the conveyor C disposed between the roll or drum 20 and the conveyor belt lifting bar 21. The conveyor belt supporting plate 66 is spaced beneath the conveyor C in Figuers 2, 4 and 6, since the conveyor belt lifting bar 21 is shown in elevated position. However, this conveyor supporting plate 66 is so positioned and so inclined as to support the corresponding portions of the conveyor belts 16 and 16a to 16d, inclusive, when the conveyor belt lifting bar 21 is in its lowermost position as shown in Figure 5.

It will be observed in Figures 4, 5 and 6 that each of the hold down members 64, 64a and 64b curves upwardly at its rear end and is fixed to a block 70 adjustably secured to a transversely disposed vertically reciprocable shaft 71 whose opposite ends are fixed in the front ends of corresponding hold down element or pressure applying element control levers 72. The hold down or pressure applying element levers 72 extend forwardly and are then bent laterally and again extend forwardly and their front ends are pivotally mounted on opposite ends of a transverse bar or shaft 73 which may be considered as a part of the machine frame since the shaft 73 is the equivalent of shaft 101 shown in Figure 8 of said copending application.

As best shown in Figures 1 and 2, it will be observed that the lateral portions of the levers 72 each rest upon the front portion of a crank arm 74 which extends rearwardly and downwardly at an angle and is fixed on a transverse rocker shaft 75. The rocker shaft 75 is journaled in bearings 76 carried by the side frame members 10 and 11.

The medial portion of rocker shaft 75 has one end of a cam lever 77 fixed thereon which extends forwardly beneath the belt supporting platform 66 (Figures 3 to 6, inclusive) and has a follower 80 thereon which rides up the periphery of a cam wheel 81 fixed on the central portion of the cam shaft 30 (Figure 3).

As the cam follower 80 is successively engaged by the high and low points of the cam wheel 81, it imparts oscillatory movement to the cam lever 77, the rocker shaft 75 and the levers or crank arms 74. Since the lateral portions of the levers 72 rest upon the front portions of the crank arms 74, oscillation of the crank arms 74 causes the rear ends of the levers 72, the shaft or bar 71 and the rear portions of the hold down strips or pressure applying elements 64, 64a and 64b to reciprocate vertically.

*Secondary or front positioning unit*

The secondary article or hose positioning unit 37 comprises a plurality of laterally spaced fingers which are shown in the form of rods, each designated at 83 in Fig. 1. These rods 83 are all fixed at their rear ends on the transverse rocker shaft 75 beneath the conveyor C. The rods or fingers 83 are of varying lengths and provided with upwardly projecting portions forming lower abutments or secondary stop elements 84 on the front ends thereof which, at times, project through the spaces between adjacent belts of the conveyor C as shown in Figure 5. These lower secondary article stop elements or guide elements 84 are arranged in such relative positions as to collectively conform substantially to the contour of the leading edge of each successive article A.

Cooperating with the lower secondary article stop elements 84 is a plurality of upper article stop or guide elements which are normally disposed immediately above the belts 16b, 16c and 16d and which are respectively designated at 85, 85a and 85c. The upper secondary stop elements 85, 85a and 85c are in the form of plates which are shaped to conform to the heel portion A-3, the leading edge of the foot A-2 and the leading edge of the toe A-1 of each successive article A and are preferably disposed adjacent the vertical planes of the free front ends of the article slides 43, 43a and 43b, respectively.

The conveyor belt supporting plate 66 is provided with a plurality of slots 66a therein to permit free vertical movement of the corresponding rods or fingers 83. The fingers 83 are caused to oscillate with the rocker shaft 75 by means of the cam wheel 81 heretofore described. Each of the article contour stop elements 85, 85a and 85c is fixed to the downturned front end of a respective rod or bar 87 which extends rearwardly and whose enlarged rear end portion is oscillatably mounted on a stationary shaft 90. Opposite ends of the shaft 90 are fixed in blocks or standards 91 carried by the side frame members 10 and 11. The enlarged rear end portions of the rods 87 are prevented from axial movement on the shaft 90 by means of collars 92 adjustably secured on the shaft 90 and the rods 87 and their corresponding upper secondary stop elements 85, 85a and 85c are normally urged downwardly by suitable springs shown in the form of torsion springs 93 in Figure 1.

In order to limit downward movement of the upper secondary positioning guides 85, 85a and 85c and to also impart vertical reciprocatory movement thereto, the medial portions of the rods 87 bear against a common transverse actuating bar or rod 95 which is bent upwardly and then rearwardly at each end thereof and its rear ends are adjustably secured to blocks 97 fixed on the transverse rocker shaft 52.

Each time the shaft 52 is moved upwardly from a lowered position by means of the cams 62, both the upper stop elements 85, 85a and 85c of the secondary positioning unit and the stop elements 40, 41 and 42 of the primary positioning unit are also moved upwardly. However, the cam arrangement is such that the conveyor belt lifting bar 21 is moved upwardly in advance of the upward movement of the shaft 52 and, in so doing, moves the belt 16b against the stop 85 and moves the belts 16c and 16d, and the front portions of the article slide members 43a and 43b into engagement with the corresponding stop elements 85a and 85c to thus raise the stop elements 85, 85a and 85c so that, actually, the rods 87 are not raised by the transverse bar or actuating bar 95, but are maintained in raised position by the bar 95 when the belts of the conveyor C are subsequently permitted to move downwardly in advance of downward movement of the transverse shaft 52.

It should be noted that the dwell of the high part of each cam 29 extends through an arc of substantially 150 degrees, the high part of each cam 29 coinciding with a portion of the dwell of the low part of the cam 81, and as the cam followers 28 are in engagement with the high parts of cams 29, the follower 80 is still engaged by the low part of the cam 81.

Thus, during the time that the low part of each cam 29 is in engagement with the corresponding follower 28, and during which a step in forward movement is imparted to the conveyor C, the rise of cam 81 is then in engagement with the follower 80 and the fall of cam 62 is in engagement with the follower 61. The relative positions of the rise and fall and the high parts and low parts of the cams 29, 62 and 81 are clearly shown in Figures 4, 5 and 6 and is such as to produce repetitive cycles in operation as will now be described.

*Method of operation*

The timed relationship between the various operating parts of the improved article positioning apparatus, the conveyor belt lifting bar 21 and the intermittent movement of the conveyor C is extremely important and, therefore, the method of operation will now be given in steps and the positions occupied by the various parts in each step will be listed.

Step No. 1.—Assuming there is a stack of hose positioned upon the platform 12, a hose or article A is placed upon the article slides 43, 43a and 43b substantially as shown in broken lines in Figure 1, with some care being taken to substantially aline the heel A-3 of the hose A with the guide or stop element 40 of the primary positioning unit 36. The hose A should be in approximate alinement with the stops 41 and 42. It is not necessary to position the hose A in exact alinement with these primary stops as such alinement is subsequently corrected by this invention. At this time, the various parts occupy substantially the position shown in Figure 6.

(a) The conveyor C is stopped or stationary.

(b) The lifting bar 21 is in fully raised position.

(c) Primary article stop elements 40, 41, 42 are in lowered position engaging slide 43 and belt 16c. The stop elements 40, 41 and 42 are shown in raised position in Figure 1 but are lowered as in Figure 6 at the time the first article is positioned thereagainst.

(d) Upper secondary or front stop elements 85, 85a, 85c are in lowered position, but are biased upwardly by the belt 16b, and the front portions of the slides 43a, 43b which are, in turn, biased upwardly by the belts 16c, 16d.

(3) Although fingers 83 and lower secondary stop elements 84 are in full raised position, the corresponding portions of the belts 16, 16a, 16b, 16c, 16d are disposed above the level of the upper ends of the lower secondary stop elements 84.

Step No. 2.—The conveyor C is still stationary.

(a) Lifting bar 21 is still in fully raised position.

(b) Parts of primary positioning unit 36 still occupy position described in Step No. 1.

(c) Fingers 83 and lower stop elements 84 move downwardly from fully raised position shown in Figure 6 to fully lowered position shown in Figure 4.

(d) Upper secondary stop elements 85, 85a, 85c still occupy position described in Step No. 1.

Step No. 3.—Rear or primary stop elements 40, 41, 42 move upwardly to fully raised position shown in Figure 4.

(a) As the stop elements 40, 41 and 42 move upwardly, the arm 95 moves upwardly and engages the arms 87 to lift the stop elements 85, 85a and 85c above the conveyor. The arrangement of the arm 95 is such as to cause a lag between the raising of the primary stop elements and the secondary stop elements. Status of all other parts is the same as that described in Step No. 2.

(b) It should be noted that, when the fingers and lower secondary stop elements 84 were lowered, the rear portions of the pressure applying members or leaf spring hold down members 64, 64a, 64b were lowered therewith, but are still spaced above the level of the corresponding portion of the conveyor C.

Step No. 4.—At the commencement of Step No. 4, all of the parts occupy the position shown in Figure 4.

(a) Conveyor belt lifting bar 21 moves from raised to fully lowered position to lower belts against upper surface of belt supporting plate 66 as shown in Figure 5. This leaves clearance between the primary and secondary stop elements and the conveyor.

(b) Conveyor C commences a step in forward movement substantially simultaneously with the commencement of downward movement of the conveyor belt lifting bar 21.

(c) Stop elements of both primary and secondary positioning units 36, 37 are still maintained in raised position and, consequently, belts move downwardly away from lower edges of upper secondary stop elements or guide elements 85, 85a, 85c. Since the guide elements 40, 41, 42 of the primary positioning unit 36 were previously raised, upon commencement of forward movement of the conveyor C, the article or hose A previously positioned against the primary stop elements 40, 41, 42 is advanced and, at substantially the same time, a preceding hose previously positioned against the secondary stop or guide elements 85, 85a, 85c is also advanced by the conveyor belts.

Step No. 5.—Conveyor C is in course of forward movement.

(a) Conveyor C is in fully lowered position.

(b) Fingers 83 and lower secondary stop elements 84 commence upward movement so the inclined upper surfaces of the fingers 83 are engaged by the hose last deposited upon the conveyor C and the slides 43, 43a, 43b as the last-named hose is advanced by the conveyor C.

(c) The secondary stop elements 85, 85a and 85c are moved downwardly as the primary stop elements 40, 41 and 42 begin to move downwardly so that the upper secondary stop elements engage the hose previously released by the primary stop elements.

(c) Stop elements 40, 41, 42 of primary positioning unit 36 are moved to fully lowered position as observed in Figure 5, there being spaced between the primary stop elements and the conveyor due to the fact that the conveyor is in lowered position.

At the interval of Step No. 6 as above described, the hose last positioned upon the conveyor C and slides 43, 43a, 43b will have been advanced to where the leading edge portions thereof engage the then raised lower secondary stop elements and the then lowered upper secondary stop elements 85, 85a, 85c. Since the hose is partially supported on the slides 43, 43a, 43b and on the corresponding belts of the conveyor C the belt will slide the hose on the slides until all of the lower stop elements 84 and all of the upper stop elements of the secondary positioning unit 37 are contacted by the leading edge of the hose A.

Step No. 7.—Conveyor C is still in course of a step in forward movement.

(a) Conveyor belt lifting bar 21 gradually moves from full lowered to fully raised position, lifting the belts of the conveyor C therewith.

(b) Belts of conveyor C then positioned above level of the upper ends of lower secondary stop elements 84.

(c) Hose is held by front or secondary upper stop elements 85, 85a, 85c as belts of conveyor C are raised above level of lower secondary stop elements 84.

(d) Hose previously released from stop elements of secondary positioning unit is maintained in engagement with the corresponding belts of the conveyor C by the pressure members 64, 64a and 64b as it is advanced to the vertical plane of the transfer applying station 15.

(e) The stop elements 40, 41, 42 of the primary positioning unit 36 are still in lowered position although they are not in engagement with the slide 43 and the belt 16c until the conveyor belt lifting bar 21 has reached fully raised position.

When the conveyor belt lifting bar 21 has reached fully raised position, all of the parts again occupy the position shown in Figure 6. The conveyor stops movement just prior to the bar 21 reaching fully raised position. In other words, at substantially the same time that or just prior to the time the slide 43 is moved into engagement with the lower surface of the then lowered heel guide 40 of the primary positioning unit 36 and at substantially the same time that the lower ends of the fingers or stop elements 41, 42 of the primary positioning unit are engaged by the belt 16c, the conveyor C ceases further forward movement thereby insuring that the operator cannot place a new hose upon the slides 43, 43a, 43b and the corresponding belts of the conveyor C while the conveyor C is in the course of forward movement.

This completes a cycle in the operation of the improved article positioning apparatus since, at the termination of Step No. 7, the parts are again positioned for a repetition of Step No. 1. Of course, during the performance of Step No. 1, the mark applying mechanism, transfer applying mechanism or printing mechanism 15 operates upon the hose then positioned on the portions of the belts of the conveyor C which then repose upon the conveyor belt lifting bar 21. This mechanism 15 may be operated in timed relation to the movement of the conveyor belt lifting bar 21 and the intermittent movement of the conveyor C in substantially the manner described in said copending application Serial No. 346,752 and, therefore a detailed description thereof is deemed unnecessary.

It should be noted that all of the stops are adjustable to accommodate articles or hose of various sizes. Also, attention is directed to the fact that each advance of the conveyor is of equal length and the secondary stops are positioned a distance from the primary stops which is somewhat less than this length to insure each article being moved into engagement with all of the secondary stops for correct alinement.

It is thus seen that we have provided an improved apparatus for positioning hose or analogous articles on an intermittently movable conveyor and wherein each successive article may be positioned upon the conveyor with a minimum of effort insofar as accurately prepositioning the article thereon is concerned.

In the drawings and specification there has been set forth a preferred embodiment of the invention and although specific terms are employed, they are used in a generic and descriptive sense only, and not for purposes of limitation, the scope of the invention being defined in the claims.

We claim:

1. In combination with apparatus for applying transfers to articles having a transfer applying station and a plurality of conveyor belts for moving articles to said transfer applying station, means for automatically positioning and alining said articles on said conveyor belts comprising primary stop elements intermittently movable to positions closely adjacent said conveyor belts and against which the articles are initially placed, a plurality of slide elements positioned in superposed relation to said conveyor belts and on which said articles slide, said slides being of less width than the conveyor belts to permit the belts to engage the articles between the slides, a plurality of secondary stop elements positioned forwardly of the primary stop elements and movable into the path of travel of said articles on said conveyor belts, means for moving the primary stop elements out of the path of travel of said articles and moving the secondary stop elements into said path of travel whereby the movement of the conveyor belts advances said articles from the primary stop elements to the secondary stop elements, said articles being frictionally engaged by the conveyor belts to cause the same to slide on said slide elements into engagement with all of the secondary stop elements, and means for moving the secondary stop elements out of the path of travel of said articles as they are advanced by the conveyor to the transfer applying station.

2. In combination with a plurality of juxtaposed intermittently driven conveyor belts for moving articles in a step by step manner, means for automatically positioning and alining said articles on said conveyor belts comprising primary stop elements intermittently movable to positions closely adjacent said conveyor belts and against which the articles are initially placed, a plurality of slide elements positioned in superposed relation to said conveyor belts and being of less width than said conveyor belts, a plurality of secondary stop elements positioned forwardly of the primary stop elements, said secondary stop elements and said conveyor being relatively movable in timed relation to the intermittent movement of said conveyor belts, to periodically position the secondary stop elements in the path of travel of the articles, means for moving the primary stop elements out of the path of travel of said articles as the secondary stop elements are positioned in said path of travel in timed relation to intermittent movement of the conveyor, whereby the movement of the conveyor belts advances said articles from the primary stop elements to the secondary stop elements, and said articles being frictionally engaged by the conveyor belts to cause the same to slide on said slide elements into engagement with all of the secondary stop elements.

3. In combination with a conveyor driven to intermittently advance in steps of equal length, means for automatically positioning and alining articles on said conveyor comprising primary stop elements intermittently movable to positions closely adjacent said conveyor and against which the articles are initially placed, a plurality of secondary stop elements positioned forwardly of the primary stop elements a distance less than the length the conveyor advances each step, means for moving the primary stop elements out of the path of travel of said articles and actuating the secondary stop elements to position the same in said path of travel whereby the movement of the conveyor advances said articles from the primary stop elements to the secondary stop elements, said articles being frictionally engaged by the conveyor to cause the same to move into engagement with all of the secondary stop elements as the conveyor moves past said elements, and means for rendering the secondary stop elements inoperable to permit the articles to be advanced by the conveyor beyond said secondary stop elements.

4. In a structure according to claim 3, resilient means engaging said articles and holding the same in contact with the conveyor as they are advanced beyond the secondary stop elements.

5. Apparatus for positioning hose and analogous articles on an intermittently moving conveyor comprising a plurality of elongated relatively thin stationary spaced slides superposed on the conveyor, a primary positioning unit comprising a plurality of stop elements normally disposed in close proximity to the upper surface of the conveyor and against which each successive article may be manually positioned while the conveyor is in stationary position, a secondary positioning unit spaced forwardly of the primary positioning unit and also comprising a plurality of stop elements normally positioned in close proximity to said conveyor, the stop elements of said secondary positioning unit being transversely spaced relative to the conveyor and being arranged to collectively conform substantially to the shape of the leading edge of each successive article, said slides extending forwardly beyond the stop elements of the secondary positioning unit, means operable automatically upon commencement of each advance by the conveyor for moving the stop elements of the primary positioning unit away from the conveyor whereby the article is advanced in frictional contact with portions of the conveyor between the slides into engagement with the stop elements of the secondary positioning unit, said conveyor causing the article to slide on the slides into alined engagement with the stop elements of the secondary positioning unit, and means operable in timed relation to the stop elements of the primary positioning unit for moving the stop elements of the secondary positioning unit out of the path of travel of the article to permit an article positioned against the stop elements of the secondary positioning unit to be advanced by said conveyor.

6. Apparatus for positioning hose and analogous articles on an intermittently moving conveyor comprising a plurality of elongated relatively thin stationary slides superposed on the conveyor and being of less width than the conveyor, a primary positioning unit comprising a plurality of stop elements normally disposed in close proximity to the upper surface of the conveyor and against which each successive article may be manually positioned while the conveyor is in stationary position, a secondary positioning unit spaced forwardly of the primary positioning unit and comprising a plurality of secondary stop elements normally positioned in close proximity to said conveyor, the secondary stop elements being transversely spaced relative to the conveyor and being arranged to collectively conform substantially to the shape of the leading edge of each successive article, said slides extending forwardly beyond the secondary stop elements, means operable automatically upon commencement of each advance by the conveyor for moving all of said stop elements away from the conveyor whereby the article is advanced in frictional contact with the conveyor and means for moving the secondary stop elements into the path of said article, said conveyor engaging the article between the slides and causing it to slide on the slides into alined engagement with the secondary stop elements, and means operable in timed relation to the stop elements of the primary positioning unit for moving the stop elements of the secondary positioning unit out of the path of travel of the hose to permit a hose positioned against the stop elements of the secondary positioning unit to be advanced by said conveyor.

7. Apparatus for positioning hose and analogous articles on an intermittently moving conveyor comprising a plurality of elongated relatively thin stationary spaced slides superposed on the conveyor and on which the articles slide, a primary positioning unit comprising a plurality of primary stop elements normally disposed in close proximity to the upper surface of the conveyor and against which each successive article may be initially positioned while the conveyor is in stationary position, a secondary positioning unit spaced forwardly of the primary positioning unit and comprising a plurality of secondary stop elements normally positioned in close proximity to said conveyor, the secondary stop elements being transversely spaced relative to the conveyor and being arranged to collectively conform substantially to the shape of the leading edge of each successive article, said slides extending forwardly beyond the secondary stop elements, means operable automatically upon commencement of each advance by the conveyor for moving the stop elements of the primary positioning unit away from the conveyor whereby the article in contact therewith is advanced in frictional contact with portions of the conveyor between the slides into engagement with the secondary stop elements, and means causing relative movement between the conveyor and the secondary stop elements in timed relation to movement of the primary stop elements to position the secondary stop elements out of the path of travel of an article previously positioned thereagainst and to then position said secondary stop elements in the path of travel of the article advanced from the primary stop elements.

8. Apparatus for alining hose and analogous articles on an intermittently moving conveyor comprising a plurality of elongated relatively thin stationary spaced slides superposed on the conveyor, primary positioning stop means normally disposed in close proximity to the conveyor and against which each successive article is initially positioned, a secondary positioning unit spaced forwardly of the primary positioning unit a distance less than the length said conveyor moves each intermittent movement, said secondary positioning unit comprising a plurality of secondary stop elements, means operable automatically upon commencement of each advance of the conveyor for moving the stop elements of the primary positioning unit out of the path of travel of said article previously positioned thereagainst whereby the hose is advanced in frictional contact with portions of the conveyor between the slides into engagement with the stop elements of the secondary positioning unit and alined thereagainst, and means operable in timed relation to the stop elements of the primary positioning unit for effecting relative movement between the secondary stop elements and the conveyor to permit the articles to move past the secondary stop elements as the conveyor is again advanced.

9. A structure according to claim 8 wherein the secondary stop elements comprise upper and lower stop elements movable relative to each other and relative to the conveyor.

10. Apparatus for positioning successive articles on an intermittently moving conveyor comprising a plurality of elongated relatively thin stationary spaced slides superposed on the conveyor and on which the articles slide, primary stop elements normally disposed in close proximity to the conveyor and against which each successive article is initially positioned, secondary stop elements spaced forwardly of the primary stop elements a distance less than the length said conveyor moves each intermittent movement and against which each article is successively moved, means for rendering the primary and secondary stop elements inoperable upon each advance of the conveyor to permit the articles positioned thereagainst to move past said stop elements, means again rendering the secondary stop elements operable to block the path of the article advancing from the primary stop elements whereby said article is advanced in frictional contact with portions of the conveyor between the slides into engagement with the secondary stop elements and alined thereagainst.

11. In a structure according to claim 10, resilient members intermittently operable to press said articles against the conveyor as they advance from the secondary stop elements.

12. A structure according to claim 10 wherein the secondary stop elements comprise upper and lower stop elements, said lower stop elements being movable relative to said conveyor and means for moving the conveyor relative to the upper stop elements.

13. In a structure according to claim 10, resilient members intermittently operable to press said articles against the conveyor as they advance from the secondary stop elements, said secondary stop elements comprising upper and lower stop elements, said lower stop elements being movable relative to said conveyor and means for moving the conveyor relative to the upper stop elements.

References Cited in the file of this patent

UNITED STATES PATENTS

| | | |
|---|---|---|
| 2,050,745 | Woodruff et al. | Aug. 11, 1936 |
| 2,114,108 | Hormel | Apr. 12, 1938 |
| 2,211,310 | Andrews | Aug. 13, 1940 |
| 2,286,458 | Bowman | June 16, 1942 |